(No Model.) 3 Sheets—Sheet 1.
H. W. HILL.
CLUTCH.

No. 476,641. Patented June 7, 1892.

WITNESSES.
Frank Miller.
Albert H. Baker.

INVENTOR.
Harry W. Hill
By his attorney
E. G. Thurston (No Model.) 3 Sheets—Sheet 2.
H. W. HILL.
CLUTCH.
No. 476,641. Patented June 7, 1892.
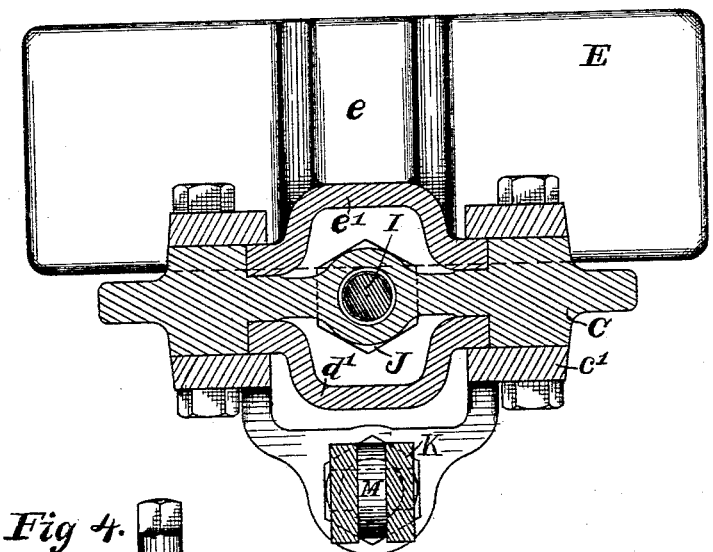
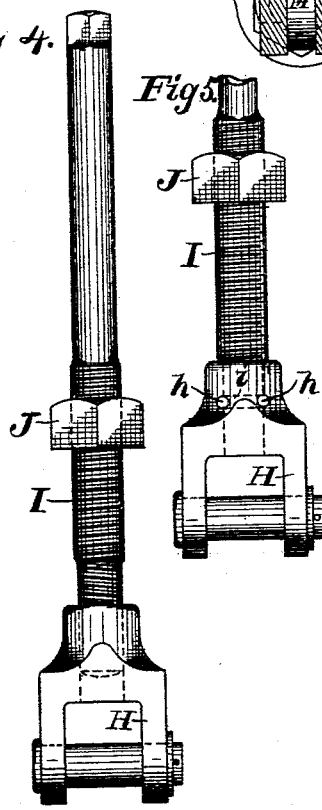
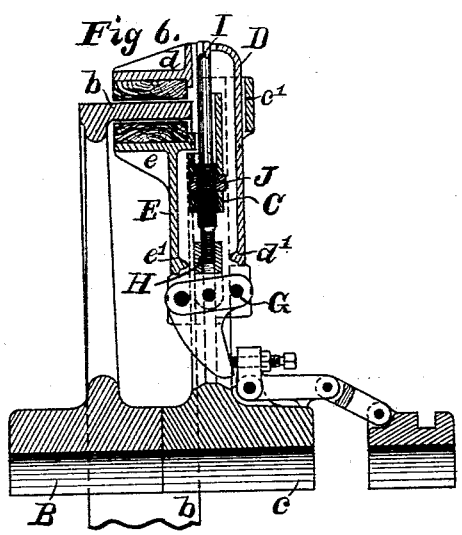
WITNESSES.
Frank Miller.
Albert H. Bates.
INVENTOR,
Harry W. Hill
By his attorney
E. L. Thurston (No Model.)  3 Sheets—Sheet 3.
H. W. HILL.
CLUTCH.
No. 476,641.  Patented June 7, 1892.
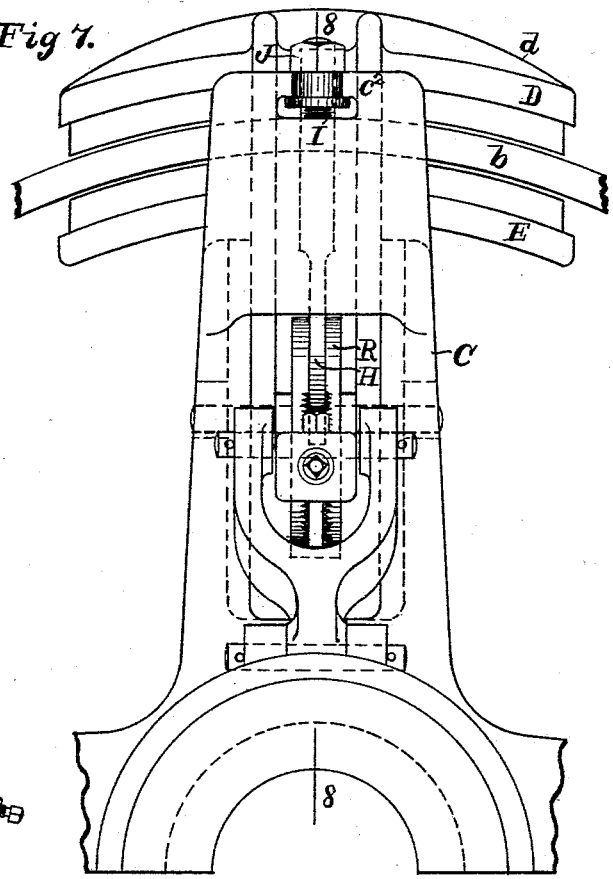
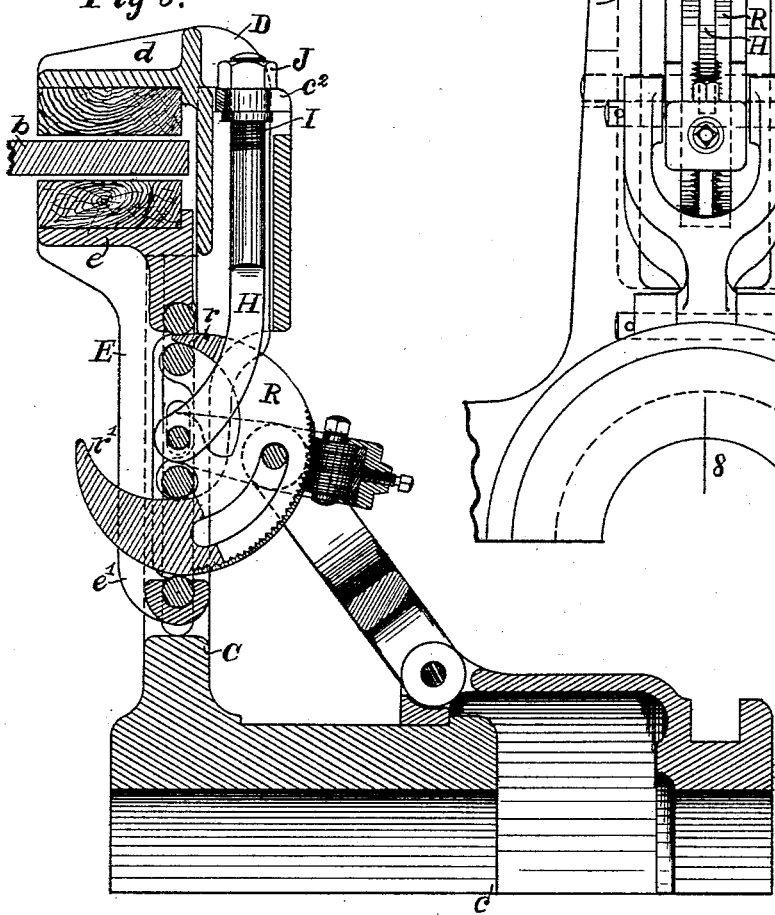
WITNESSES.
Frank Weiller
Albert H. Bates.
INVENTOR.
Harry W. Hill
By his attorney
E. L. Thurston

UNITED STATES PATENT OFFICE.

HARRY W. HILL, OF CLEVELAND, OHIO.

CLUTCH.

SPECIFICATION forming part of Letters Patent No. 476,641, dated June 7, 1892.

Application filed July 13, 1891. Renewed April 13, 1892. Serial No. 428,981. (No model.)

*To all whom it may concern:*

Be it known that I, HARRY W. HILL, a citizen of the United States, residing at Cleveland, in the county of Cuyahoga and State of Ohio, have invented certain new and useful Improvements in Friction-Clutches, of which the following is a specification.

My invention relates to the class of friction-clutches in which a pair of clutch members are mounted on each clutch-arm and are simultaneously and inversely moved toward and from an interposed cylindrical pulley-flange for the purpose of grasping and releasing the same.

In a still more specific form it relates to the class of friction-clutches in which a pair of clutch members are mounted on a clutch-arm and are simultaneously and inversely moved toward and from an interposed cylindrical pulley-flange by means of a rocking lever pivotally connected with the clutch-arm and on opposite sides of this pivot with the clutch members, respectively.

The principal object of the invention is to provide means for adjusting the throw of the jaws of a clutch, whereby they may be made to impinge with equal pressure against the pulley-flange when the clutch is first set up, and also when after use the jaws or the flange may have become unevenly worn.

My invention consists, broadly, in the combination of a pulley having a cylindrical flange, a clutch-arm, a pair of clutch members mounted on said arm and adapted to grasp said flange between them, a movable device which engages with both of said clutch members and by its movement moves them simultaneously in opposite radial directions, and a radially-adjustable connection between said movable device and clutch-arm.

It also consists of the more specific development of this generic invention, and also in the details of construction and combination of parts which are hereinafter described, and definitely pointed out in the claims.

Figure 1:
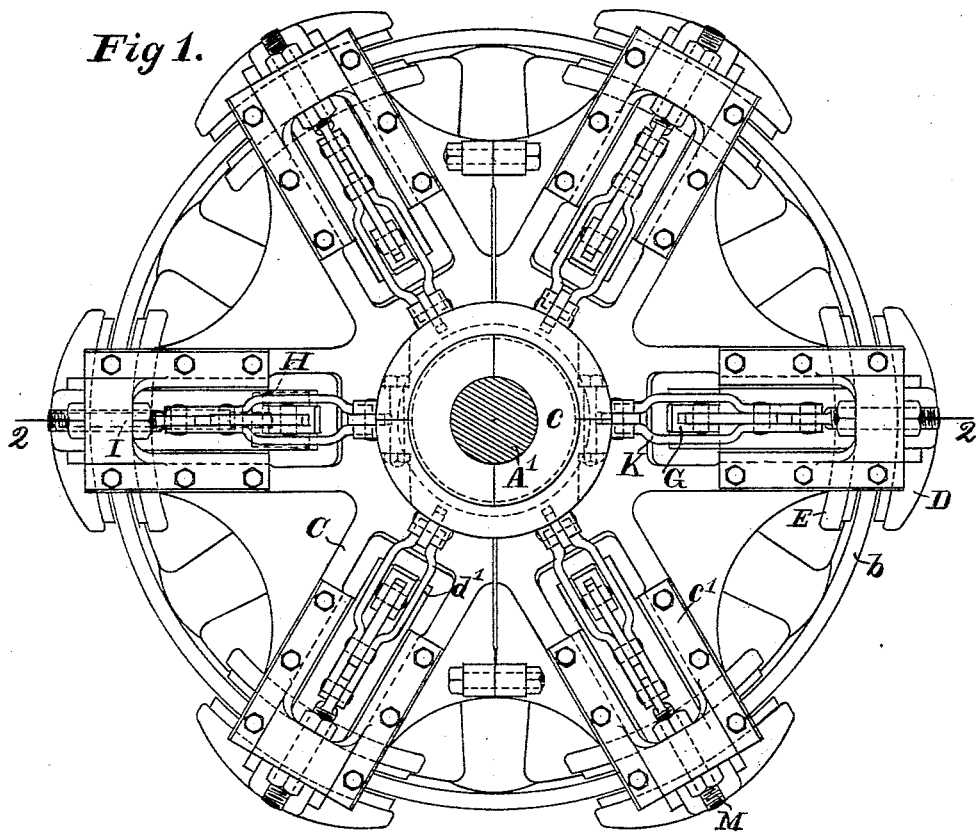
Figure 2:
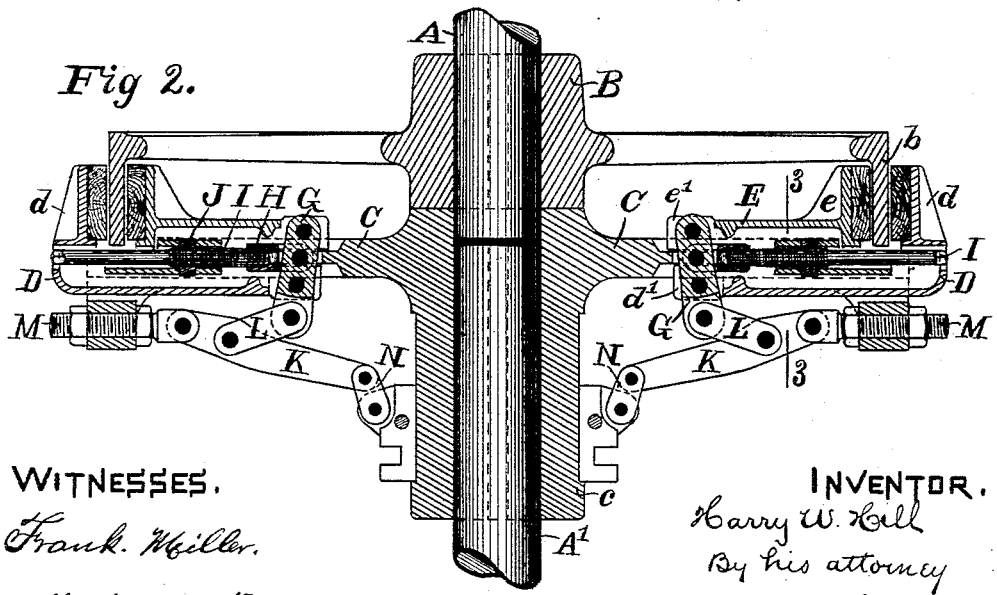

In the drawings, Figure 1 is a side elevation of a friction-clutch which contains the entire invention embodied in its most satisfactory form. Fig. 2 is a sectional view on line 2 2 of Fig. 1. Fig. 3 is a sectional view through one of the clutch-arms and the mechanism mounted thereon at the point indicated by the line 3 3 of Fig. 2, looking outward from the shaft. The clutch shown in Figs. 1, 2, and 3 is generically like the clutch shown in Letters Patent No. 429,446, granted June 3, 1890, to L. J. Hirt. Fig. 4 is a detached view of the block to which the rocking lever is pivoted and the screw with which said block may be moved radially for the purpose of adjusting the jaws. Fig. 5 is a detached view of the same parts in a slightly-modified form. Fig. 6 is a longitudinal sectional view through one arm of a clutch containing my adjustable mechanism, the clutch shown in this figure being generically like the clutch shown in my prior patent, No. 312,122, dated February 10, 1885. Fig. 7 is a side elevation of one arm of another style of clutch to which my adjusting mechanism is applied; and Fig. 8 is a sectional view of said arm, &c., at the point indicated by line 8 8 of Fig. 7. The clutch shown in the last two figures is generically like the clutch shown and described in an application of Frank Miller, filed March 11, 1889, Serial No. 302,795.

I will now proceed to describe in detail the clutch shown in Figs. 1, 2, and 3 of drawings, for the reason that this clutch not only contains the broad invention, but it represents the best specific embodiment thereof and contains all of the specific combinations which I desire to claim.

Referring now to the parts by letters, A represents the shaft, and B a hub secured thereto, having spokes which support a cylindrical flange $b$, concentric with said shaft. Rigidly secured to the shaft A' by means of a key or other suitable device is a hub $c$, from which radiate as many clutch-arms C as it is desired to employ clutch systems.

In the clutch shown in Figs. 1 and 2 six clutch-arms and associate clutch systems are shown, although any desired number might be employed provided they were properly disposed about the shaft to balance each other. Each clutch-arm and its associated clutch system is like every other, so that a description of one will answer for all. D represents the outer and E the inner clutch member. The outer clutch member is provided with a concave jaw $d$ and the inner clutch member with a convex jaw e, which jaws are adapted to press on the outer and inner sides, respectively, of the cylindrical pulley-flange b. Said clutch members are also provided with shanks d' e', respectively, which are supported upon the clutch-arm in any appropriate manner, whereby they are adapted to slide radially toward and from said flange b. The gibs c' are the means employed in the clutch shown in the drawings to hold the clutch members against the clutch-arm.

G represents a pivoted lever, which is the device that by its rocking motion imparts to the jaws their simultaneous inverse movement. Heretofore in clutches where the rocking lever has been employed to impart to a pair of clutch members a simultaneous inverse movement the points of connection between said lever and clutch-arm have not been radially adjustable. In such clutches various adjusting mechanisms have been employed; but the function of these various adjusting mechanisms was to make the jaws approach more or less near to each other to compensate for even wear upon the jaws or to enable the jaws to grasp flanges of different thicknesses but of the same diameter. The greatest of care has been necessary in constructing said clutches, because any variation in the diameter of the flanges, any error however slight in placing the pivot-holes in the jaws or in the connection between the clutch-arm and the jaw-moving device, or any variation in the thickness of the jaw-shoes would cause the jaws to bear unevenly and thus injuriously affect the operation of the clutch. In clutches fitted with my invention this great care is unnecessary and the cost of building operative clutches is cheapened, notwithstanding the fact that more parts are introduced.

In the clutches shown in Figs. 1, 2, and 6 the jaw-moving device is the well-known rocking lever. This lever is pivoted to a block H, and this block is adjustably connected with the clutch-arm. The means for making this connection are as follows, viz: the nut J, fixed to the web of the clutch-arm, the screw I, which screws through said nut and has a smaller screw-thread running in the opposite direction at its end, which screws into the end of the block H. The screw extends outward between the clutch members and through a hole in the outer jaw, whereby it can be turned by a wrench. I prefer to use the differential screw shown in Fig. 4, for the reason that a finer adjustment can be obtained, and for the further reason that it is cheaper than any other entirely satisfactory construction now known to me; but the connection between the screw I and either the nut J or block H might be such as to permit the screw to revolve, while relative endwise movement between the screw and said part was prevented. An example of this construction is shown in Fig. 5, in which the screw I screws through the nut J and the end enters the block H, where it is held by means of the annular groove i, around the inner end of the screw, and the pins h h, which are secured to the block H after the end of the screw has been inserted and which lie in said groove i. The pivotal connection between the lever G and the jaws (which have no considerable movement other than the radial movement) prevents the block H from moving sidewise or in any direction, except radially, as the screw is revolved. The lever is rocked by any appropriate means—as, for example, the angle-arm and bell-crank lever—suitably connected with the usual sliding sleeve, (shown in Fig. 6,) which is substantially the mechanism for this purpose shown in my prior patent, No. 312,122, hereinbefore referred to; or the lever G may be rocked by the toggle mechanism shown in Figs. 1 and 2, which is generically like that shown in Letters Patent No. 429,446, hereinbefore mentioned. Specifically this toggle mechanism differs from that shown in the said patent in these particulars chiefly, viz: The toggle-arm K is made in two parts suitably bent, substantially as shown, whereby the eye in the end of the adjustment-screw M, the toggle-arm L, and the link N lie between said two parts, and the three pivot-pins secure them all together. Moreover, the two parts of the lever K lie so far apart that when the jaws are closed the end of the lever G lies between said two parts. With this construction the clutch is cheaper and requires less space on the shaft than the clutch shown in said prior patent.

In the clutch illustrated in Figs. 7 and 8 the clutch members are moved by means of the block R, which is pivotally connected with the clutch-arm and has two curved wedge-arms r r', which, when said block is rocked on its pivot, engage with the jaw-shanks, one for the purpose of opening and one for the purpose of closing the jaws. In this clutch the block R is pivoted to the adjustable block H and the block H is moved radially by the screw I, which screws through the nut J. The nut J is attached to the yoke c², which is attached to the clutch-arm. The pivot-pin, by means of which the wedge-block R and the adjustable block H are connected, extends at each end into radial grooves in the clutch-arm, whereby said block H is compelled to move radially and not otherwise. The upper wedge-arm r of the wedge-block is slotted, as shown, so that the block H may pass through it to the pivot. In other respects the clutch is substantially like that which is fully described in the Miller application, above mentioned. I have not attempted to explain the entire construction of said clutch, but only so much thereof as concerns the adjustable connection between the jaw-moving device and the clutch-arm, and I have explained this much to show that my generic invention is not limited to a clutch in which the jaw-moving device is a rocking-lever, but may be applied to clutches having various forms of jaw-moving devices, which are connected with the clutch-arm.

I claim as my invention—

1. In a friction-clutch, in combination, a clutch-arm and pair of radially-movable clutch members supported thereon, a movable device which engages with both of said clutch members, whereby when either clutch member is moved the other is simultaneously moved in the opposite direction, and a radially-adjustable connection between said movable device and clutch-arm, substantially as and for the purpose specified.

2. In a friction-clutch, in combination, a shaft, a cylindrical flange suitably supported from and concentric with said shaft, a clutch-arm, a pair of clutch members mounted on said arm, a radially-movable block adjustably secured to said clutch-arm and lying between the clutch members, a movable device connected with said block and engaging with said clutch members, and means for moving said device, substantially as and for the purpose specified.

3. In a friction-clutch, in combination, a shaft, a cylindrical flange supported from and concentric with said shaft, a clutch-arm, a pair of clutch members mounted thereon, a block, a movable device suitably connected with said block and engaging with both of said clutch members and adapted by its movement to move them in opposite radial paths, and a screw engaging with said clutch-arm and block, whereby said block may be moved toward and from said flange, substantially as and for the purpose specified.

4. In a friction-clutch, in combination, a shaft, a cylindrical flange supported from and concentric with said shaft, a clutch-arm, a pair of clutch members mounted thereon, a block adjustably connected with said arm, a lever pivoted to said block and on opposite sides of said block to the clutch members, respectively, and means for rocking said lever on its middle pivot, substantially as and for the purpose specified.

5. In a friction-clutch, in combination, a shaft, a cylindrical flange supported from and concentric with said shaft, a clutch-arm, a pair of clutch members mounted thereon, a block lying between said members, a lever pivoted to said block and on opposite sides of said pivot with the clutch members, respectively, an adjustment-screw engaging with said block and with the clutch-arm, and means for rocking said lever, substantially as and for the purpose specified.

6. In a friction-clutch, in combination, a shaft, a cylindrical flange supported from and concentric with said shaft, a clutch-arm, a pair of clutch members mounted on said arm, a lever G, pivotally connected with said clutch-arm and on opposite sides of that pivot with the clutch members, respectively, a toggle-lever K, made in two independent pieces and pivoted to the clutch-arm, a toggle-arm L, lying between the two parts of the toggle-arm K and pivoted thereto and to the lever G, a link N, pivotally connected with the sliding sleeve and lying between the two parts of the lever K and pivoted thereto, and a sliding sleeve, substantially as and for the purpose specified.

HARRY W. HILL.

Witnesses:
E. L. THURSTON,
ALBERT H. BATES.